(12) United States Patent
Lan et al.

(10) Patent No.: US 8,287,376 B2
(45) Date of Patent: Oct. 16, 2012

(54) GAME DRUM HAVING MICRO ELECTRICAL MECHANICAL SYSTEM PRESSURE SENSING MODULE

(75) Inventors: Hai Lan, Taipei Hsien (TW); Ga-Lane Chen, Santa Clara, CA (US); Tai-Hsu Chou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 306 days.

(21) Appl. No.: 12/813,113

(22) Filed: Jun. 10, 2010

(65) Prior Publication Data

US 2011/0172011 A1    Jul. 14, 2011

(30) Foreign Application Priority Data

Jan. 14, 2010  (CN) .......................... 2010 1 0300317

(51) Int. Cl.
 *A63F 9/24* (2006.01)
 *A63F 13/00* (2006.01)
(52) U.S. Cl. ............ 463/37; 463/36; 84/411 R; 702/138
(58) Field of Classification Search ............. 463/36–37; 702/138; 84/411 R
See application file for complete search history.

(56) References Cited

U.S. PATENT DOCUMENTS

| | | | | |
|---|---|---|---|---|
| 3,551,580 A * | 12/1970 | Glenn et al. | ..................... | 84/723 |
| 4,479,412 A * | 10/1984 | Klynas | ............................. | 84/730 |
| 4,669,349 A * | 6/1987 | Hyakutake | ...................... | 84/730 |
| 4,753,146 A * | 6/1988 | Seiler | ................................ | 84/730 |
| 4,781,097 A * | 11/1988 | Uchiyama et al. | ............. | 84/738 |
| 4,947,725 A * | 8/1990 | Nomura | ........................... | 84/723 |
| 5,438,529 A * | 8/1995 | Rosenberg et al. | ............ | 708/131 |
| RE36,387 E * | 11/1999 | Rosenberg et al. | ............ | 702/139 |
| 6,279,402 B1 * | 8/2001 | Fisher | ............................... | 73/754 |
| D453,030 S * | 1/2002 | Lutchen et al. | .............. | D21/329 |
| D454,906 S * | 3/2002 | Senda et al. | .................. | D17/22 |
| D455,774 S * | 4/2002 | Senda et al. | .................. | D17/22 |
| 6,378,378 B1 * | 4/2002 | Fisher | ............................... | 73/754 |
| 6,550,337 B1 * | 4/2003 | Wagner et al. | .................. | 73/715 |
| 6,561,040 B1 * | 5/2003 | Henderson et al. | ............ | 73/763 |
| 6,645,067 B1 * | 11/2003 | Okita et al. | ....................... | 463/7 |
| 6,820,490 B2 * | 11/2004 | Mittelstein et al. | ............ | 73/715 |
| 7,080,442 B2 * | 7/2006 | Kawamura et al. | ............ | 29/594 |
| 7,092,539 B2 * | 8/2006 | Sheplak et al. | ............... | 381/114 |
| 7,179,985 B2 * | 2/2007 | Pickens | ........................... | 84/743 |
| 7,256,342 B2 * | 8/2007 | Hagiwara et al. | ............... | 84/726 |
| 7,297,863 B2 * | 11/2007 | May | ................................ | 84/723 |
| 7,426,873 B1 * | 9/2008 | Kholwadwala et al. | ........ | 73/818 |
| 7,479,064 B2 * | 1/2009 | Wakitani et al. | ............... | 463/36 |
| 7,491,879 B2 * | 2/2009 | Hikino et al. | ................... | 84/615 |
| 8,184,845 B2 * | 5/2012 | Leidl et al. | ..................... | 381/369 |

(Continued)

Primary Examiner — Steven J Hylinski

(74) Attorney, Agent, or Firm — Altis Law Group, Inc.

(57) ABSTRACT

A game drum includes a drum body, a compressible member and a MEMS pressure sensing module. The drum body includes an output interface circuit for coupling with a terminal electronic device. The compressible member is accommodated in the accommodating room of the drum body. The MEMS pressure sensing module includes a MEMS sensor, located under the compressible member, for sensing a pressure applied on the compressible member and converting the pressure values into electronic signals, a processing unit for calculating a value of the pressure according to the electronic signals, and a power supply unit for supplying power to the processing unit and the transmitting unit. The processing unit is connected with the output interface circuit such that a user is able to obtain the pressure value from the terminal electronic apparatus.

19 Claims, 4 Drawing Sheets

U.S. PATENT DOCUMENTS

| | | | |
|---|---|---|---|
| 8,229,139 B2* | 7/2012 | Pahl | 381/150 |
| 2003/0035558 A1* | 2/2003 | Kawamura et al. | 381/113 |
| 2003/0221545 A1* | 12/2003 | Tomoda | 84/723 |
| 2004/0170086 A1* | 9/2004 | Mayer et al. | 367/178 |
| 2006/0230912 A1* | 10/2006 | Pickens | 84/743 |
| 2008/0127799 A1* | 6/2008 | Yamashita et al. | 84/244 |
| 2011/0108838 A1* | 5/2011 | Kageyama | 257/49 |
| 2011/0160560 A1* | 6/2011 | Stone | 600/398 |
| 2011/0160609 A1* | 6/2011 | Stone | 600/561 |
| 2011/0301504 A1* | 12/2011 | Lan et al. | 600/592 |

\* cited by examiner

GAME DRUM HAVING MICRO ELECTRICAL MECHANICAL SYSTEM PRESSURE SENSING MODULE

CROSS REFERENCE TO RELATED APPLICATION

This application is related to a commonly-assigned copending application, Ser. No. 12/813,100, entitled "MOTION CONTROLLER HAVING MICRO ELECTRICAL MECHANICAL SYSTEM PRESSURE SENSING MODULE". The disclosure of the above-identified application is incorporated herein by reference.

BACKGROUND

1. Technical Field

The present disclosure relates to input devices for electronic game apparatuses, and particularly, to a game drum including a micro electrical mechanical system (MEMS) pressure sensing module.

2. Description of Related Art

Following rapid development of electronic technology, a plurality of wireless-control game apparatuses has been disclosed. A typical wireless-control game apparatus generally includes a host device and a wireless input device. Using a drum game for instance as an example, in use, when beating the game drum, a signal reflecting a beating force that the player applies is transmitted into the host device, and then music is broadcasted from a terminal electronic apparatus. The music may not sound as correctly as it should be, so the user has to adjust the beating force. Unfortunately, the game apparatus is unable to provide the exact value of the beating force. The player must adjust this external force by trial and error. Therefore, a game drum capable of notifying the beating force in real-time is desired.

BRIEF DESCRIPTION OF THE DRAWINGS

Many aspects of the present game drum can be better understood with reference to the following drawings. The components in the drawings are not necessarily drawn to scale, the emphasis instead being placed upon clearly illustrating the principles of the present game drum. Moreover, in the drawings, like reference numerals designate corresponding parts throughout the several views.

DETAILED DESCRIPTION

Embodiment of the present game drum having a MEMS pressure sensing module will now be described in detail below and with reference to the drawings. The MEMS is an integrated micro system including a micro sensor, a processor, a circuit for processing and controlling signals, an interface circuit, a communicator, and a power supply.

Figure 1:
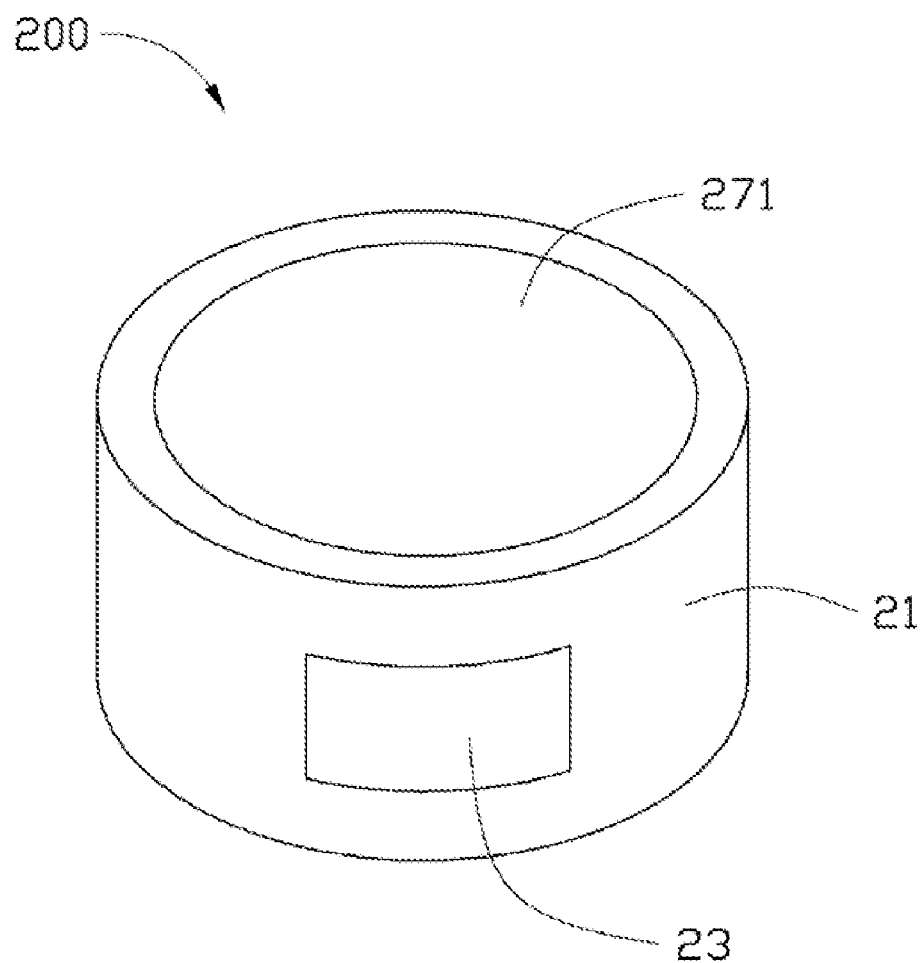
FIG. 1 is an isometric view of a game drum in accordance with a first embodiment, where the game drum has a MEMS pressure sensing module.
Figure 2:
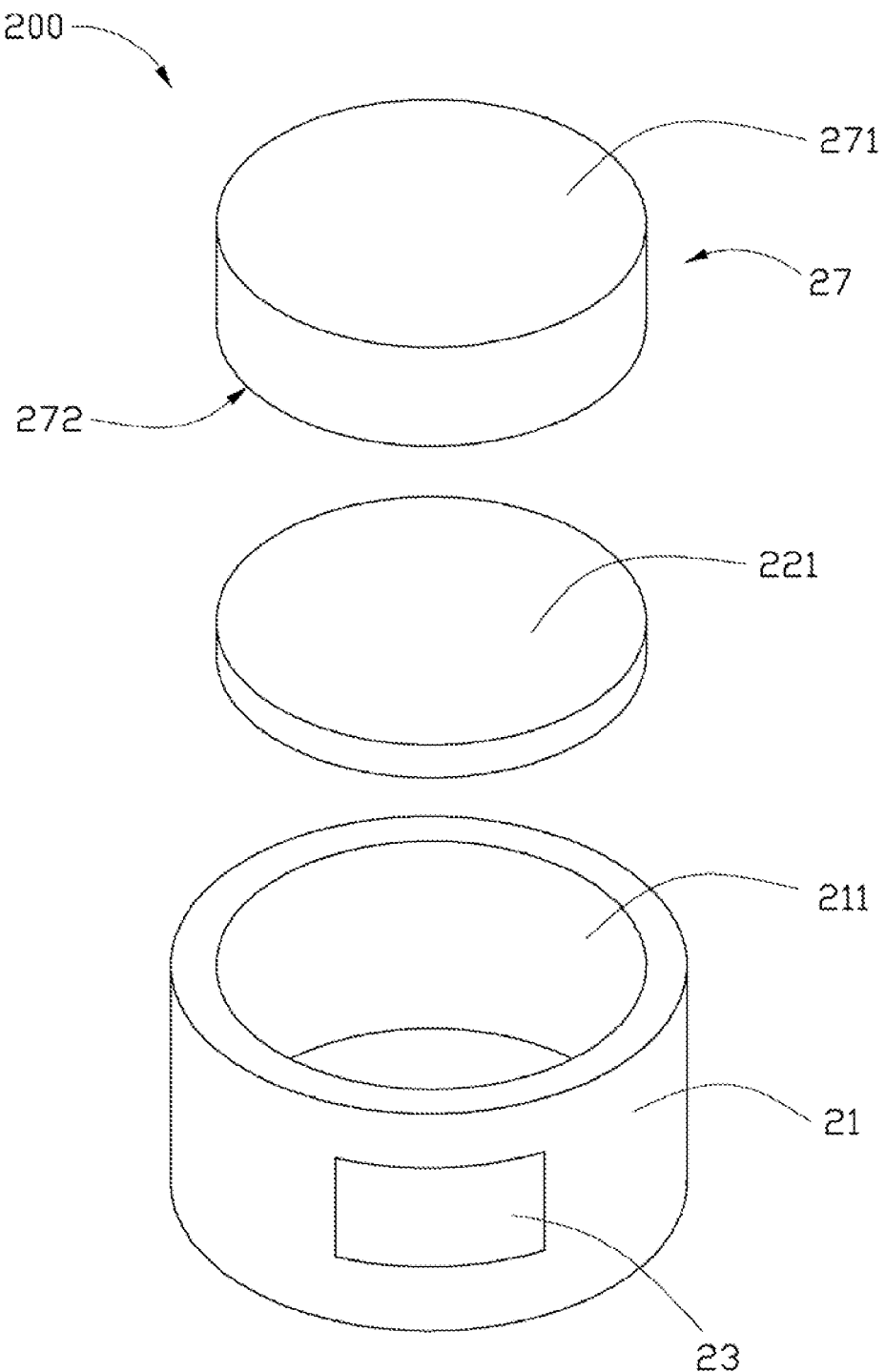
FIG. 2 is an exploded view of the game drum of FIG. 1.
Figure 3:
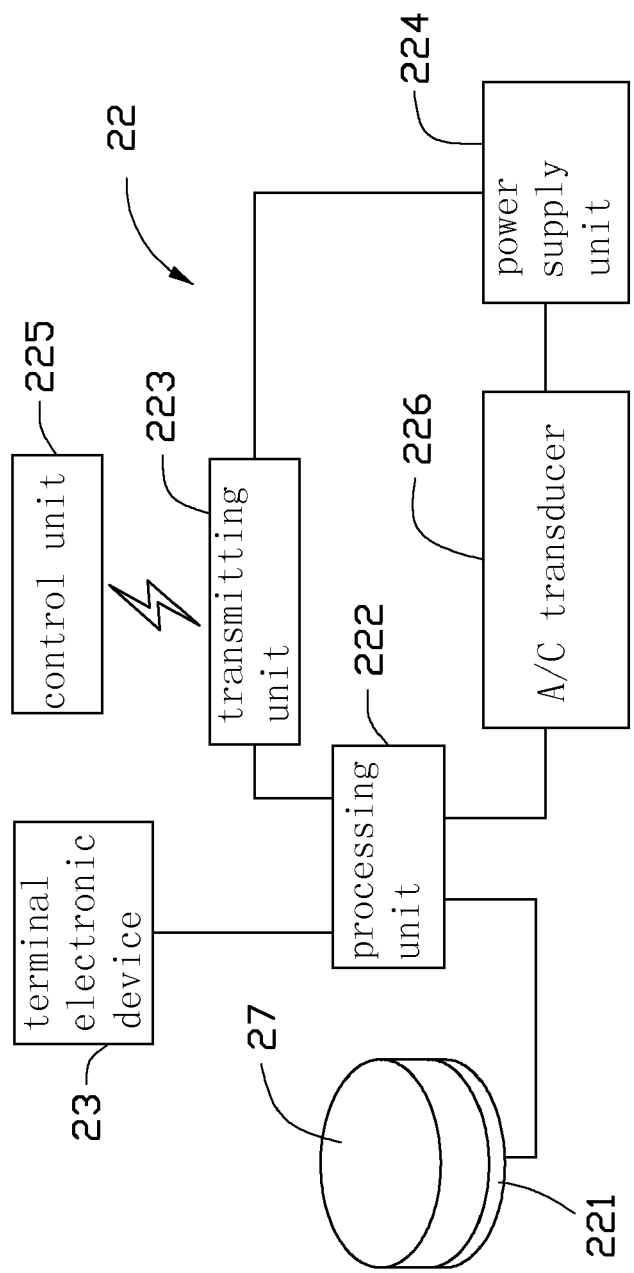
FIG. 3 is block diagram shows a configuration of the MEMS pressure sensing module.

Referring to FIGS. 1 and 2, a game drum 200 includes a drum body 21, a compressible member 27, a MEMS pressure sensing module 22 and a terminal electronic device 23. The drum body 21 is hollow cylinder, and defining an accommodating room 211. In addition, the drum body 21 includes an output interface circuit (not shown) for coupling with the terminal electronic device 23. The output interface circuit is integrated on a printed circuit board (not shown), which is accommodated in the drum body 21.

The compressible member 27 includes a drumhead beating surface 271 and a fixed surface 272 opposite to the drumhead beating surface 271. The drumhead beating surface 271 adheres to the inner sidewalls of the drum body 21 for sealing the accommodating room 211 at the top of the drum body 21. The fixed surface 272 defines an opening (not shown). The compressible member 27 is capable of deforming under pressure, and recovering to its original shape upon being released. In the present embodiment, the compressible member 27 is a membrane, made of rubber. In alternate embodiments, the compressible member 27 does not define the opening, and is directly disposed on a MEMS sensor 221.

The MEMS pressure sensing module 22 includes the MEMS sensor 221, a processing unit 222, a transmitting unit 223, a power supply unit 224, a control unit 225 and an A/D transducer 226 which are all integrated on the printed circuit board. The MEMS sensor 221 supports the compressible member 27 with sealing the opening of the fixed surface 272 of the compressible member 27. When beating the drumhead beating surface 271 of the compressible member 27, an airflow resultantly produces and applies an impact force equivalent to a pressure applied thereon. The MEMS sensor 221 is capable of sensing the amount of pressure according to the impact force and converting the pressure value into a plurality of digital signals.

The processing unit 222 electrically connects with the MEMS sensor 221, and is configured for calculating the values of the pressure according to the digital signals from the MEMS sensor 221. The processing unit 222 is a micro control unit. In an alternate embodiment, the processing unit 222 is an application specific integrated circuit.

The transmitting unit 223 couples with the processing unit 222 and the control unit 225, and is configured for transmitting the values of the pressure from the processing unit 222 to the control unit 225. In the present embodiment, the transmitting unit 223 is a BLUETOOTH unit.

The power supply unit 224 is configured for supplying power to the transmitting unit 223 and the processing unit 222. The A/C transducer 226 interconnects with the processing unit 222 and the power supply unit 224, and is configured for converting a voltage of the power supply unit 224 into a rated voltage for the processing unit 222.

The control unit 225 is configured for storing the values of the pressure, and controlling an operation of the terminal electronic apparatus 23 through the output interface circuit. In the present embodiment, the terminal electronic apparatus 23 is a display mounted in the drum body 21, and is exposed to the exterior. In an alternate embodiment, the terminal electronic apparatus 23 is an audio device for directly broadcasting the values of the pressure.

The MEMS pressure sensing module 222 is relatively small, sensitive, and has a quick response to any pressure. Therefore, a player can obtain more accurate values of the pressure that they apply in real-time.

In alternately embodiments, the terminal electronic device 23 is precluded from the present game drum 200. Under this setup, consumers can select from many types of terminal electronic apparatus, such as a television or a computer for coupling with the drum body 21 having the MEMS pressure sensing module 22 and the output interface circuit. Connection between the terminal electronic device 23 and the control unit 225 can be wireless.

Furthermore, the game drum 200 can include a plurality of compressible members 27, and a plurality of MEMS sensors 221 in which each MEMS sensor 221 supports and seals the opening of each of the compressible members 27, or one single MEMS sensor 221 sealing all of the openings of the compressible members 27.

Figure 4:
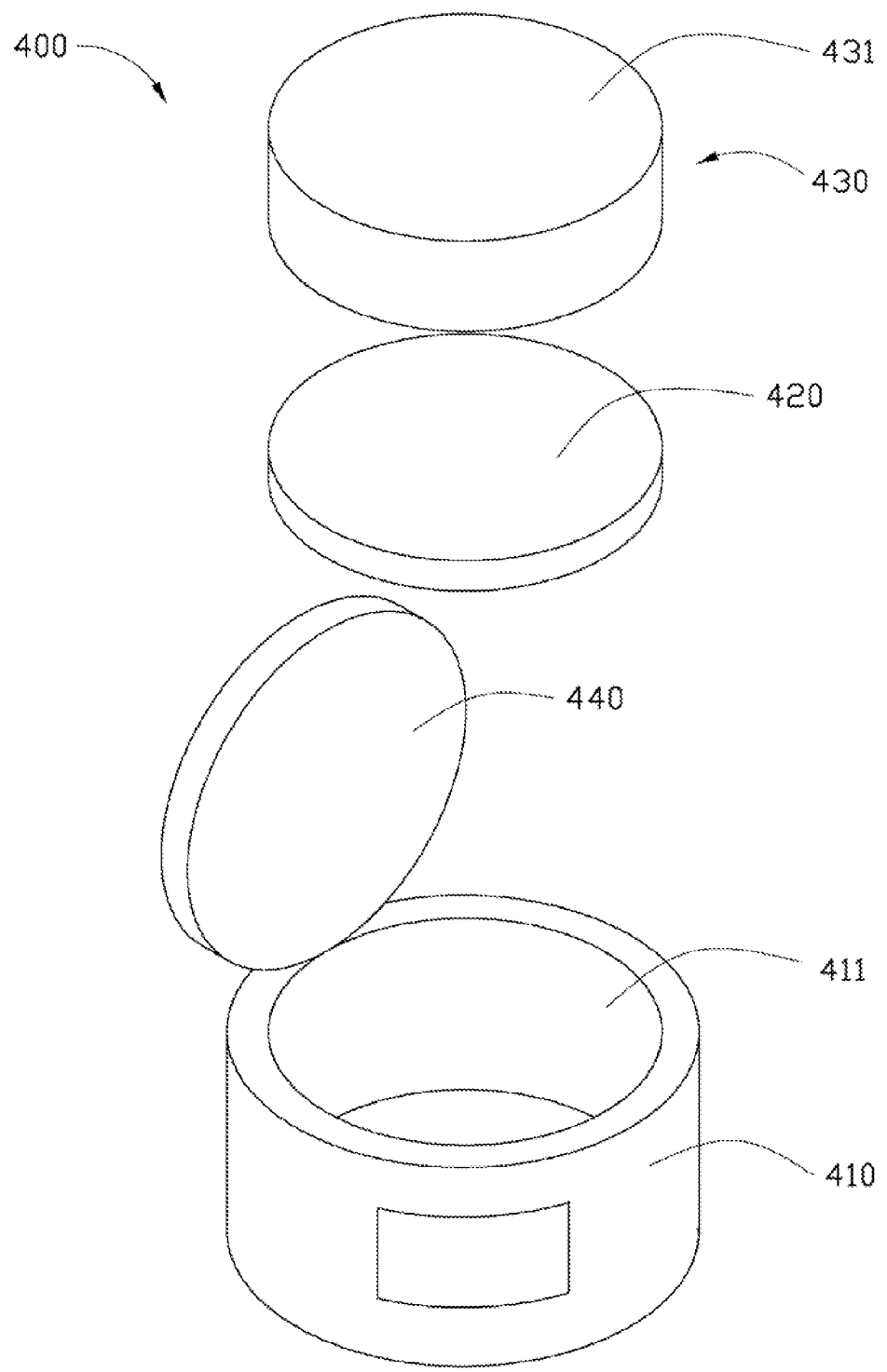
FIG. 4 is an isometric, exploded view of another game drum in accordance with a second embodiment.

Referring to FIG. 4, another game drum 400 is provided in a second embodiment. The game drum 400 has similar structure as that of the game drum 200, including having a drum body 410 defining an accommodating room 411. In addition, the game drum 400 includes a MEMS pressure sensing module 420, a compressible member 430, and an elastic cover 440 directly laminated in that order. The cover 440 seals the accommodating room 411 with the peripheral regions thereof and is adhered to the drum body 410. The cover 440 contacts with the beating surface 431 of the compressible member 430. As such, contaminants are prevented from polluting the compressible member 430, and in use, the compressible member 430 deforms when the cover 440 is beaten. A difference between the game drums 200, 400 is that the compressible member 430 has no opening, and is directly disposed on the MEMS sensor (not shown) of the MEMS pressure sensing module 420.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A game drum, comprising:
   a drum body having an output interface circuit for coupling with a terminal electronic device and defining an accommodating room;
   a compressible member accommodated in the accommodating room; and
   a MEMS pressure sensing module, comprising:
   a MEMS sensor under the compressible member, configured for sensing a pressure value of the pressure applied on the compressible member and converting the pressure value of the pressure into a plurality of electronic signals;
   a processing unit for calculating the pressure value of the pressure according to the electronic signals, and the processing unit being connected with the output interface circuit such that a user is able to obtain the pressure value of the pressure from the terminal electronic apparatus; and
   a power supply unit for supplying power to the processing unit;
   wherein the MEMS pressure sensing module further comprises a transmitting unit and a control unit, the transmitting unit and the control unit are electrically connected with the output interface circuit; the transmitting unit is capable of transmitting the pressure value to the control unit, and the control unit is capable of storing the pressure value;
   wherein the MEMS pressure sensing module further comprises an A/C transducer interconnecting with the processing unit and the power supply unit;
   wherein the output interface circuit, the MEMS sensor, the processing unit, the power supply unit, the transmitting unit, the control unit and the A/C transducer are integrated on a printed circuit board accommodated in the drum body;
   wherein the terminal electronic device is mounted in and exposed from the drum body.

2. The game drum of claim 1, wherein the compressible member defines an opening, and the MEMS sensor seals the opening.

3. The game drum of claim 1, wherein the compressible member comprises a drumhead beating surface and a fixed surface opposite to the beating surface, the drumhead beating surface seals the accommodating room and the fixed surface contacts the MEMS sensor.

4. The game drum of claim 1, further comprising a cover, wherein the cover seals the accommodating room, and the compressible member contacts the cover.

5. The game drum of claim 1, further comprising a terminal electronic device for notifying the pressure value, wherein the terminal electronic device couples with the output interface circuit.

6. The game drum of claim 1, wherein the terminal electronic device wirelessly connects with the control unit.

7. A game drum, comprising:
   a drum body defining an accommodating space;
   a compressible member received in the accommodating space;
   a MEMS pressure sensing module comprising a MEMS sensor configured for sensing a pressure applied to the compressible member and converting the pressure into electronic signals, a processing unit configured for calculating a value of the pressure according to the electronic signals, and a power supply unit configured for supplying power to the processing unit; and
   a terminal electronic device configured for displaying the value of the pressure, the terminal electronic device being mounted in and exposed from the drum body.

8. The game drum of claim 7, wherein the MEMS pressure sensing module further comprises a transmitting unit and a control unit;
   the transmitting unit is electrically connected to the processing unit, and is configured for transmitting the value of the pressure calculated by the processing unit to the control unit;
   the control unit is electrically connected to the terminal electronic device through an output interface circuit, and is configured for controlling the terminal electronic device to display the value of the pressure.

9. The game drum of claim 8, wherein the MEMS pressure sensing module further comprises a transducer interconnecting with the processing unit and the power supply unit, the transducer is configured for converting a voltage of the power supply unit into a rated voltage for the processing unit.

10. The game drum of claim 9, wherein the output interface circuit, the MEMS sensor, the processing unit, the power supply unit, the transmitting unit, the control unit and the transducer are integrated on a printed circuit board received in the accommodating space of the drum body.

11. The game drum of claim 7, wherein the compressible member comprises a drumhead beating surface and a fixed surface opposite to the beating surface, the fixed surface defines an opening, the MEMS sensor supports the compressible member and seals the opening of the fixed surface.

12. The game drum of claim 11, wherein the compressible member is configured for producing an airflow when the pressure is applied thereon by beating the drumhead beating surface, the airflow provides an impact force corresponding to the pressure, and the MEMS sensor senses the pressure according to the impact force.

13. A game drum, comprising:
   a drum body defining an accommodating space;
   a compressible member received in the accommodating space;

a MEMS pressure sensing module comprising a MEMS sensor configured for sensing a pressure applied to the compressible member and converting the pressure into electronic signals, and a processing unit configured for calculating a value of the pressure according to the electronic signals; and a terminal electronic device configured for displaying the value of the pressure;

wherein the compressible member is configured for producing an airflow when the pressure is applied to the compressible member, the airflow provides an impact force corresponding to the pressure applied to the compressible member, and the MEMS sensor senses the pressure according to the impact force;

wherein the terminal electronic device is mounted in and exposed from the drum body.

14. The game drum of claim 13, wherein the compressible member comprises a drumhead beating surface and a fixed surface opposite to the beating surface, the pressure is applied to the compressible member by beating the drumhead beating surface.

15. The game drum of claim 14, wherein the fixed surface defines an opening, the MEMS sensor supports the compressible member and seals the opening of the fixed surface.

16. The game drum of claim 15, wherein the airflow passes through the opening and applies the impact force onto the MEMS sensor.

17. The game drum of claim 13, wherein the MEMS pressure sensing module further comprises a transmitting unit and a control unit;

the transmitting unit is electrically connected to the processing unit, and is configured for transmitting the value of the pressure calculated by the processing unit to the control unit;

the control unit is electrically connected to the terminal electronic device through an output interface circuit, and is configured for controlling the terminal electronic device to display the value of the pressure.

18. The game drum of claim 17, wherein the MEMS pressure sensing module further comprises a power supply unit configured for supplying a voltage; and a transducer interconnecting with the processing unit and the power supply unit, and the transducer is configured for converting the voltage of the power supply unit into a rated voltage for the processing unit.

19. The game drum of claim 18, wherein the output interface circuit, the MEMS sensor, the processing unit, the power supply unit, the transmitting unit, and the control unit and the transducer are integrated on a printed circuit board received in the accommodating space of the drum body.

* * * * *